US011119922B1

(12) United States Patent
Kimelman et al.

(10) Patent No.: US 11,119,922 B1
(45) Date of Patent: Sep. 14, 2021

(54) DATA PROCESSING SYSTEM IMPLEMENTED HAVING A DISTRIBUTED CACHE

(71) Applicant: NXP USA, Inc., Austin, TX (US)

(72) Inventors: Paul Kimelman, Alamo (CA); Brian Christopher Kahne, Austin, TX (US)

(73) Assignee: NXP USA, Inc., Austin, TX (US)

( * ) Notice: Subject to any disclaimer, the term of this patent is extended or adjusted under 35 U.S.C. 154(b) by 15 days.

(21) Appl. No.: 16/797,681

(22) Filed: Feb. 21, 2020

(51) Int. Cl.
*G06F 12/0811* (2016.01)

(52) U.S. Cl.
CPC .... *G06F 12/0811* (2013.01); *G06F 2212/604* (2013.01)

(58) Field of Classification Search
CPC ............... G06F 12/0811; G06F 12/084; G06F 2212/1024; G06F 12/0813; G06F 12/0815; G06F 12/0842; G06F 12/0824; G06F 2212/282; G06F 2212/604
USPC ......................................................... 711/122
See application file for complete search history.

(56) References Cited

U.S. PATENT DOCUMENTS

| 7,805,575 | B1 | 9/2010 | Agarwal et al. |
| 7,882,307 | B1 | 2/2011 | Wentzlaff et al. |
| 7,913,048 | B2 | 3/2011 | Shen |
| 8,196,147 | B1 | 6/2012 | Srinivasan et al. |
| 8,200,901 | B1 | 6/2012 | Wentzlaff et al. |
| 8,539,155 | B1 | 9/2013 | Miao et al. |
| 8,621,184 | B1 | 12/2013 | Radhakrishnan et al. |
| 10,628,312 | B2 | 4/2020 | Kimelman et al. |
| 2005/0091121 | A1* | 4/2005 | Charney ............. G06F 12/0813 705/26.1 |
| 2009/0189909 | A1* | 7/2009 | Jiao .......................... G06T 1/60 345/506 |
| 2011/0022754 | A1* | 1/2011 | Cidon ................. G06F 15/7825 710/107 |
| 2014/0208031 | A1 | 7/2014 | Raikin et al. |

OTHER PUBLICATIONS

Beckmann et al.: "ASR: Adaptive Selective Replication for CMP Caches", 2014 47TH Annual IEEE/ACM International Symposium On Microarchitecture; [Proceedings of the Annual ACM/IEEE International Symposium On Microarchitecture], IEEE Computer Society, 1730 Massachusetts Ave., NW Washington, DC 20036-1992 USA, Dec. 9, 2006 (Dec. 9, 2006), pp. 443-454.

(Continued)

*Primary Examiner* — Hashem Farrokh (57) ABSTRACT

In a data processing system having a local first level cache which covers an address range of a backing store, a distributed second level cache has a plurality of distributed cache portions, each assigned as a home cache portion for a corresponding non-overlapping address sub-range of the address range of the backing store. Upon receipt of a read access request to a read-only address location of the backing store, the local first level cache is configured to, when the read-only address location misses in the local first level cache, send the read access request to a most local distributed cache portion of the plurality of distributed cache portions for the local first level cache to determine whether the read-only access location hits or misses in the most local distributed cache portion, in which the most local distributed cache portion is not the home cache portion for the read-only address location.

20 Claims, 2 Drawing Sheets

(56) References Cited

OTHER PUBLICATIONS

Wang et al.: "Dynamic reusability-based replication with network address mapping in CMPs", Design Automation Conference (ASP-DAC), 2012 17th Asia and South Pacific, IEEE, Jan. 30, 2012 (Jan. 30, 2012), pp. 487-492.

* cited by examiner

DATA PROCESSING SYSTEM IMPLEMENTED HAVING A DISTRIBUTED CACHE

BACKGROUND

Field

This disclosure relates generally to data processing systems, and more specifically, to a data processing system having a distributed cache.

Related Art

Caches are typically used in data processing systems to speed up memory accesses by preventing the need for a processor of the data processing system to load data from or store data to the backing store, such as the main memory, which typically requires much longer access times. In a data processing system with a distributed cache, each processor has its own local level 1 (L1) cache, but the level 2 (L2) cache is divided in portions and distributed among the L1 caches. With this distributed cache, getting to the proper underlying L2 portion upon a miss in an L1 cache can add a lot of overhead in time. Therefore, a need exists for an improved distributed cache which allows for faster access times.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a data processing system includes a plurality of processors, each having its own corresponding level 1 (L1) cache (its local L1 cache) which is coupled to a distributed level 2 (L2) cache. Each L1 cache is coupled to a distributed portion of the L2 cache. Typically, each distributed portion of the L2 cache corresponds to (i.e. covers) a unique set of addresses of a backing store (such as a system memory), such that each access address of the backing store is only stored in one of the distributed portions of the L2 cache (i.e. can only exist in one place). This ensures that memory coherency is maintained among the different L2 portions of the L2 cache, such as for coherent memory writes to the backing store. However, some of the data of the backing store is read-only, and in this case, coherency is not an issue since the read-only data cannot be modified. Therefore, for read-only address locations, they can be replicated in more than one L2 cache portion to enable faster access by increasing the probability that cached read data will be found in an L2 cache portion which is local to the requesting processor.

Figure 1:
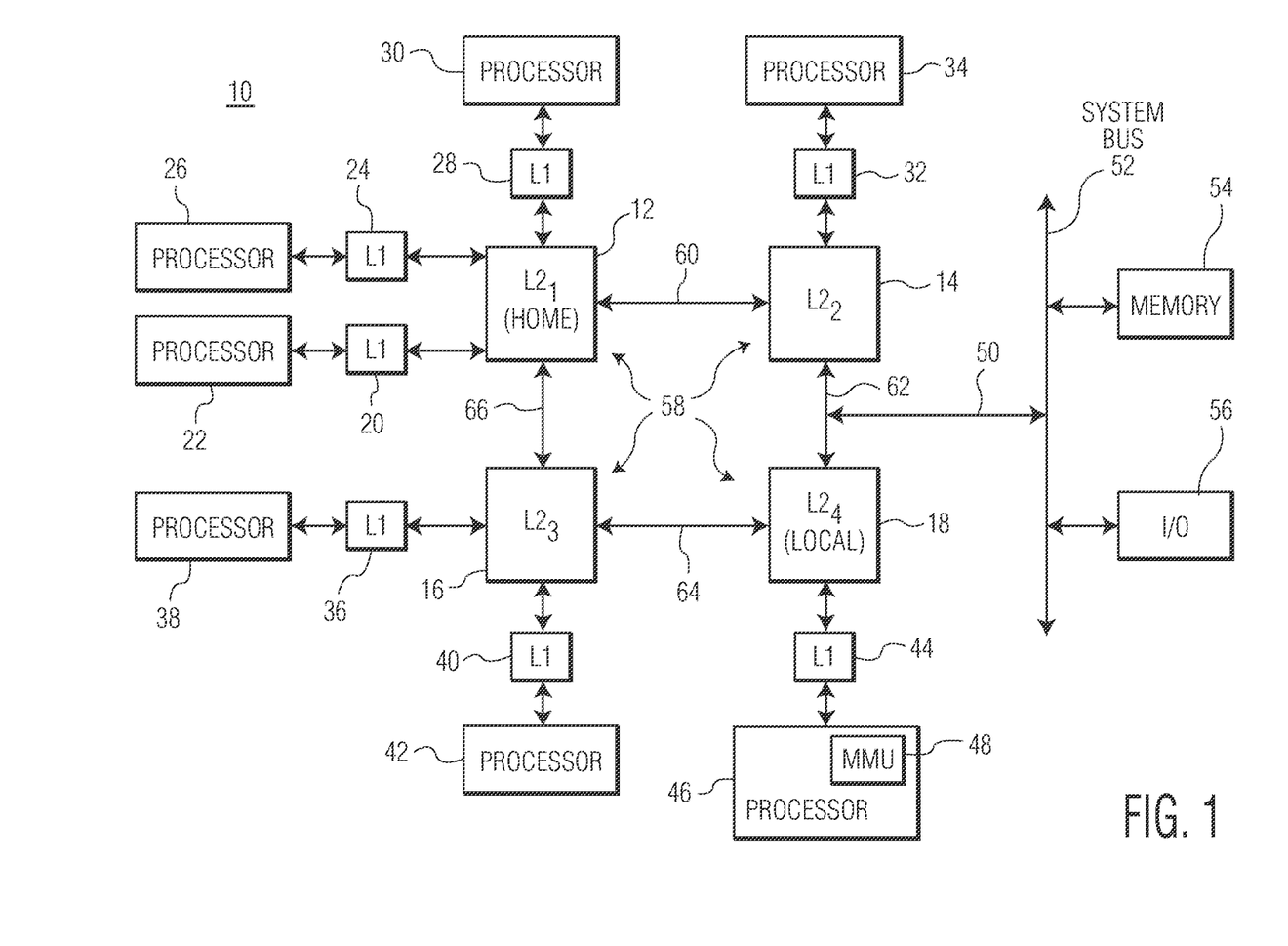
FIG. 1 illustrates, in block diagram form, a data processing system implemented with a distributed level 2 (L2) cache, in accordance with one embodiment of the present invention.

FIG. 1 illustrates, in block diagram form, a data processing system 10 which includes a distributed L2 cache 58. Data processing system 10 includes a system bus 52 (which can be any type of bus or interconnect, such as a crossbar switch, etc.), a memory 54 bi-directionally coupled to system bus 52, and input/output circuits 56 bi-directionally coupled to system bus 52. Data processing system 10 also includes a plurality of processors, such as processors 22, 26, 30, 34, 38, 42, and 46, in which each processor is coupled to a corresponding L1 cache. For example, processor 30 is coupled to L1 cache 28, processor 26 is coupled to L1 cache 24, processor 20 is coupled to L1 cache 22, processor 34 is coupled to L1 cache 32, processor 42 is coupled to L1 cache 40, processor 38 is coupled to L1 cache 36, and processor 46 is coupled to L1 cache 44. Processor 46 includes a memory management unit (MMU) 48, however, note that any of the processors in data processing system 10 may also include its own corresponding MMU. Each of the processors in data processing system 10 can be any type of processor.

Data processing system 10 includes a distributed L2 cache 58 which includes four distributed portions: portion 12 (referred to as $L2_1$), portion 14 (referred to as $L2_2$), portion 16 (referred to as $L2_3$), and portion 18 (referred to as $L2_4$). The L2 cache portion with the shortest or most reasonable route from a particular L1 cache is referred to as the most local (i.e. closest in time) L2 cache portion for the L1 cache (and the processor corresponding to the L1 cache). For example, the $L2_1$ portion is directly coupled to each of L1 caches 20, 24, and 28, and is considered the most local L2 cache portion for each of these caches (as well as for processors 22, 26, and 30). The $L2_2$ portion is directly coupled to L1 cache 32, and is considered the most local L2 cache portion for this cache (and for processor 34). The $L2_3$ portion is directly coupled to each of L1 caches 36 and 40, and is considered the most local L2 cache portion for each of these caches (as well as for processors 38 and 42). The $L2_4$ portion is directly coupled to L1 cache 44, and is considered the most local L2 cache portion for this cache (and for processor 46). Note that, in one embodiment, for any particular L1 cache and its most local L2 cache portion, there is no distributed portion of the L2 cache coupled between them.

The distributed portions of L2 cache 58 are coupled to each other in an M×N mesh network, in which in the illustrated embodiment, M=2 and N=2, such that $L2_1$ is coupled to adjacent neighbors $L2_3$ and $L2_2$ via interconnects 66 and 60, respectively. $L2_2$ is coupled to adjacent neighbors $L2_1$ and $L2_4$ via interconnects 60 and 62, respectively. $L2_3$ is coupled to adjacent neighbors $L2_1$ and $L2_4$ via interconnects 66 and 64, respectively. $L2_4$ is coupled to adjacent neighbors $L2_2$ and $L2_3$ via interconnects 62 and 64, respectively. In this example, note that for an L2 portion to communicate with a non-adjacent L2 portion, the communication is provided via one or more intermediate L2 portions. For example, communications between $L2_4$ and $L2_1$ are done via interconnects 62 and 60 of the mesh network. The mesh network (also referred to as the mesh interconnect network), including interconnects 60, 62, 64, and 66, is bidirectionally coupled to system bus 52 via interconnect 50. Note that interconnect 50 can be connected to any location of the mesh network, but is illustrated as being coupled to interconnect 62.

In one embodiment, for each L1 cache, a particular distributed portion of the L2 cache can be designated as the most local L2 cache portion for that L1 cache. Note that a local L2 cache portion may not be the closest in physical distance to the corresponding L1 cache, but yet provides the shortest or most reasonable route via the mesh network. In one embodiment, in which a much larger mesh network is implemented than as illustrated in FIG. 1, an L2 portion which is closest in time to a particular set of L1 caches can be designated as the most local L2 portion for any L1 in the particular set of L1 caches. Furthermore, for the L1 caches, the time to a most local L2 cache portion compared to the time to the home L2 cache portion may be much shorter or only somewhat shorter for a given access address. For example, the time to the most local L2 cache portion may be close to the same when the mesh network is idle, but becomes shorter due to congestion. That is, there is not a fixed relationship between the time to a most local L2 cache portion and the time to the home L2 cache portion, but in general, the time to the most local L2 cache portion is faster. Note that within a system, the distributed L2 cache and the L1 caches should agree on which distributed cache portion is the local cache portion for each L1 cache.

Note that there can be any number of processors (of any type) in data processing system 10, in which each processor includes its own L1 cache. The L1 caches of data processing system 10 are located outside the mesh network and are each coupled to a corresponding local L2 cache portion of distributed L2 cache 58. (Alternatively, the L1 caches may also be considered to be part of the mesh network.) Distributed L2 cache 58 may include any number of distributed cache portions (such that M and N can each be any integer number greater than one). Also, the mesh network may be laid out differently than the illustrated M×N grid. For example, any fabric configuration may be used to interconnect the distributed L2 cache portions. That is, the mesh network refers to the set of interconnects used to interconnect the distributed portions of the L2 cache. Also, data processor system 10 may include any number of peripherals (of any type) coupled to system bus 52.

In operation, the processors of data processing system 10 and their corresponding L1 caches operate as known in the art. For example, the processors can be any type of processors, and the L1 caches can be any type of cache, such as a data cache, instruction cache, or mixed cache, and can be a direct cache or a multi-way set associative cache. The L1 caches can also implement any known cache protocols (including, e.g., write-through or copy back protocols, cache eviction and replacement policies, etc.). Distributed L2 cache 58 can also be any type of cache, such as an instruction cache (for code), data cache (for general data), or mixed cache, and may also be either a direct cache or a multi-way set-associative cache.

In the illustrated embodiment, memory 54 (which may be any type of memory, such as, e.g., a flash memory, a static random access memory (SRAM), a dual data rate memory (DDR), a system cache, etc.) is the backing store for the L1 and L2 caches of system 10. Note that each of the L1 caches may cover the entire address space of the memory 54 or less than the entire address space. Each of the L2 portions of distributed L2 cache 58 statically covers a unique, non-overlapping, portion of the address space of memory 54. For example, in the illustrated embodiment, each L2 portion may cover ¼ of the address space of memory 54. For any access address within the address space covered by a corresponding L2 portion, that corresponding L2 portion is considered the home L2 portion for the access address. Therefore, every address location of memory 24 has one home L2 portion. In one embodiment, the route from an L1 cache to its most local L2 cache portion is shorter in time than the route from the L1 cache to the home L2 portion for a particular access address. Note that the static portion of the address space assigned to each L2 portion may be stored or indicated by control circuitry of each L2 cache portion.

As will be discussed further below, in addition to statically covering the assigned portion of the address space of memory 54, each of the distributed L2 portions of distributed L2 cache 58 may also cover a range of read-only addresses of memory 54 which may be located outside the assigned portion of the address space. Therefore, any coherent writeable address space of memory 54 can be stored in only one of the L2 portions while any of the read-only addresses of memory 54 may be stored in multiple L2 portions, including an L2 portion which is not the home L2 portion of the read-only address. In this manner, cached read data of read-only addresses may be stored in multiple L2 portions in hopes that the read data, upon a subsequent request, is local to the requesting processor, which prevents the need to access additional L2 portions via the mesh network or the backing store, both of which increase the access time. Operation of distributed L2 cache 58 will be discussed further with respect to FIG. 2.

Figure 2:
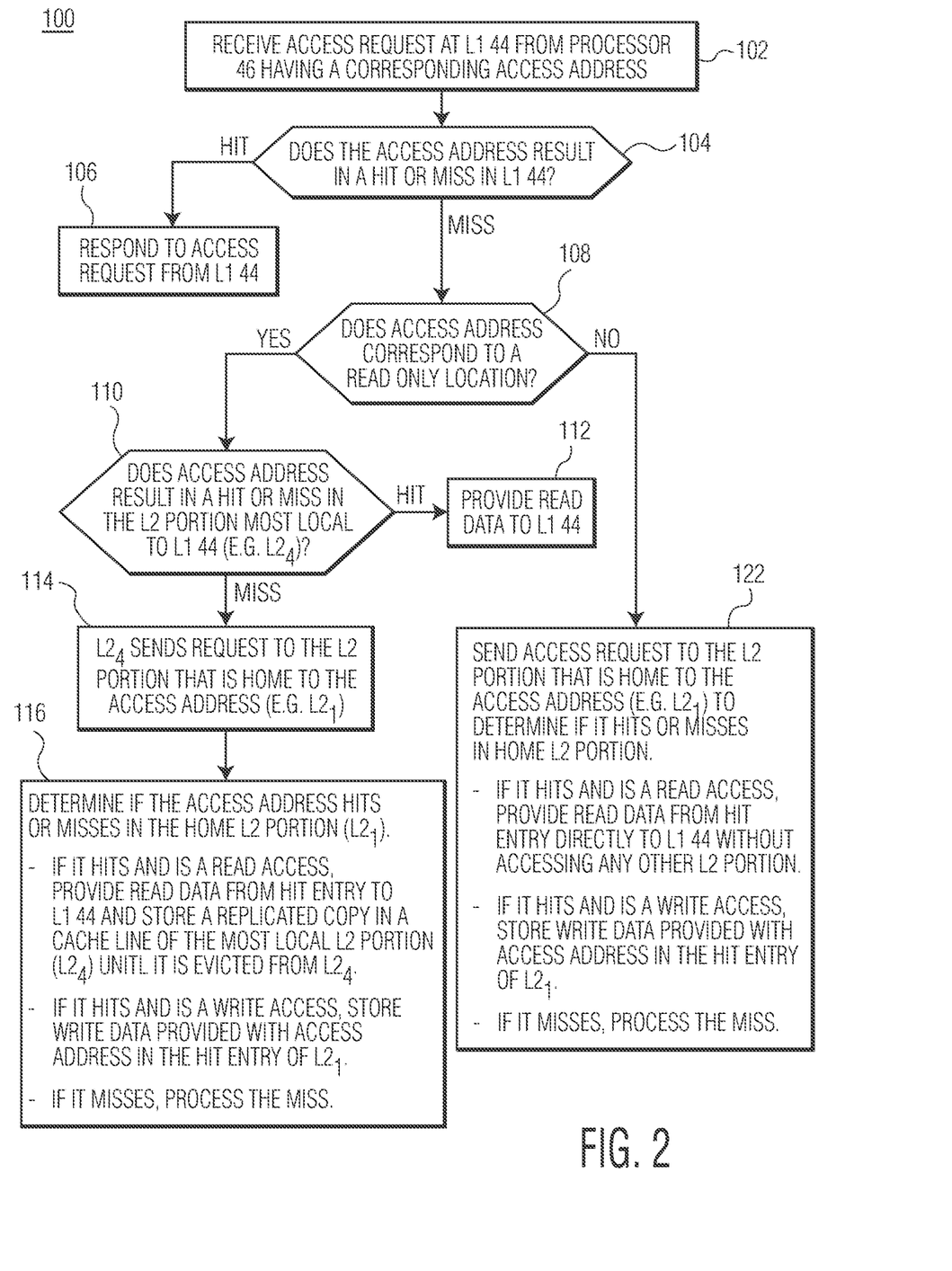
FIG. 2 illustrates, in flow diagram form, a method of processing an access request in the data processing system of FIG. 1, in accordance with one embodiment of the present invention.

FIG. 2 illustrates, in flow diagram form, a method 100 for processing an access request in data processing system 10. Method 100 will be described in reference to data processing system 10. Method 100 begins in block 102 in which an access request is received at L1 cache 44 from processor 46 (i.e. the requesting processor), in which the access request has a corresponding access address (which is an address of memory 54). At decision diamond 104, it is determined whether the access address results in a hit or miss in L1 cache 44. The hit/miss determination in the L1 caches can be performed as known in the art. If the access address results in a hit, the access request is responded to from L1 cache 44. That is, in the case of a read access request, the read data is provided from L1 cache 44 back to processor 46 and in the case of a write access request, the write data provided with the access request is stored in the hit entry of the cache. (As indicated above, any cache policy for processing a write to a cache entry can be implemented by the L1 cache. For example, the write may be treated as a write through or a copy back cache write, based on the design of the L1 cache.)

If, at decision diamond 104, the access address results in a miss in L1 cache 44, method 100 proceeds to decision diamond 108 in which it is determined whether the access address corresponds to a read-only location of memory 54. In one embodiment, a portion of the access address provides the indication of whether the access address is a read-only address or not. In an alternate embodiment, the indication of whether an access address is a read-only address or not may be provided with side-band signals or by using any other method. The indication of a read-only location may be provided, for example, by MMU 48 of processor 46.

If, at decision diamond 108, the access address corresponds to a read-only location, it is determined, at decision diamond 110, if the access address results in a hit or a miss in the L2 portion most local (i.e. closest in time) to L1 cache 44 (e.g. $L2_4$). The hit/miss determination can be determined as known in the art. If the access address results in a hit, then, in block 112, the read data is provided from the hit entry of $L2_4$ to L1 cache 44. L1 cache 44 may then allocate a cache line for the access address and corresponding read data in accordance with its cache allocation policy and can also respond to processor 46 with the read data. If the access address results in a miss, then, in block 114, portion $L2_4$ sends the access request to the L2 portion which is home to the access address (e.g. $L2_1$ in the current example). The request can be sent by way of interconnects 62 and 60. Note that in the illustrated embodiment, the route from L1 cache 44 to its most local L2 portion ($L2_4$) via the mesh network is shorter in time than to the corresponding home portion ($L2_1$).

In response to the home L2 portion ($L2_1$) receiving the access request, in block 116, the home L2 portion determines if the access address results in a hit or a miss. This hit/miss determination may also be performed as known in the art. If the access request is a read access request and hits in $L2_1$, then $L2_1$ provides the read data from the hit entry of $L2_1$ to L1 cache 44. L1 cache 44 may then allocate a cache line for the access address and corresponding read data in accordance with its cache allocation policy and can also respond to processor 46 with the read data. However, in addition to providing the read data to L1 cache 44, a replicated copy of the read data is stored in a cache line of the most local L2 portion ($L2_4$) to L1 cache 44. In this case, a cache line is allocated in $L2_4$ for the access address and corresponding read data in accordance with the cache allocation policy of distributed L2 cache 58. In allocating a cache line in either an L1 cache or in an L2 portion, either an empty cache line can be used or, if no empty cache lines are available, an existing cache line may be selected for eviction and replacement in accordance with the replacement strategy of the cache. In one embodiment, a least recently used (LRU) or a pseudo LRU may be used to evict a cache line or other priority strategies may be used.

By storing the replicated copy of the read data in a cache line of $L2_4$, both the home L2 portion ($L2_1$) and the most local L2 portion ($L2_4$) now cache (i.e. store) a copy of the read-only access address and the corresponding read data. As a result, a subsequent access request from L1 cache 44 to this access address may be completed faster, assuming the access address has not been evicted since being allocated into $L2_4$. For example, upon a subsequent request from L1 cache 44 to this access address, the access address would result in a hit in the L2 portion most local to L1 cache 44. Therefore, in this case, at decision diamond 110, method 100 would continue to block 112 to return the read data to L1 44 without having to send the access request to the home L2 portion at all (i.e. without having to perform blocks 114 and 116), resulting in a faster access time.

In one embodiment, when a new cache line is allocated for the replicated read data in the most local L2 portion, the replacement policy of distributed L2 cache 58 can make the newly allocated cache line the lowest priority so that it is first to be evicted, when needed. In one embodiment, the replacement policy of L1 cache 44 can also evict the newly allocated cache line more readily since the most local L2 portion can quickly provide the read data when requested.

Referring back to block 116 for the current access address, if the access address is a write access request and hits in the home L2 portion ($L2_1$), the write data provided with the access address is stored in the hit entry of $L2_1$. (Note that, similar to the L1 caches, any cache policy for processing a write to a cache entry can be implemented by the portions of distributed L2 cache 58. For example, the write may be treated as a write through or a copy back cache write, based on the design of the distributed L2 cache.)

If the access address misses in the home L2 portion, then the miss is processed. For a read access, this includes sending out a request to the backing store (e.g. memory 54), and upon $L2_1$ receiving the read data from the backing store to allocate into $L2_1$, sending the read data to the requesting L1 cache (L1 cache 44) for allocation as well as the most local L2 portion ($L2_4$) for allocation. The read data is also provided to the requesting processor (processor 46). Therefore, in this example, the read data for the read-only location is cached (i.e. stored) in both the home L2 portion as well as the most local L2 portion. For a write access, processing the miss includes providing the write access request and corresponding write data to the backing store. In one embodiment, a cache line may be allocated in the requesting L1 cache and the home L2 portion for the write access address and corresponding write data. Note that in the case of a write access address, it can only be allocated or cached in one L2 portion, i.e. the home L2 portion, and cannot be stored in multiple L2 portions. This ensures that memory coherency is maintained. Only read accesses to read-only locations can be stored to multiple L2 portions.

Referring back to decision diamond 108, if the access address is not a read-only location, method 100 proceeds to block 122, in which the access request is sent to the L2 portion that is home to the access address ($L2_1$ in the current example) to determine if the access address hits or misses in the home L2 portion. Note that in this case, unlike the case in which the access address corresponds to a read-only location, a hit or miss determination in the most local L2 portion is not performed. That is, the hit/miss determination is only made in the home L2 portion. As discussed above, if the access address is for a write access or a read access to a non read-only location, it cannot be located in any other L2 portion other than its home L2 portion in order to maintain coherency. Therefore, no hit/miss determination needs to be performed in the most local L2 cache.

If, in block 122, the access request is a read access request which hits in the home portion, the read data is provided directly to L1 cache 44 without accessing any other L2 portion. Therefore, unlike a hit for a read access request to a read-only location, a replicated copy of the read data is not stored in a cache line of the most local L2 portion. If the access request is a write request which hits in the home portion, write data provided with the access address is written to the hit entry in accordance with the cache policy of distributed L2 cache 58. If the access address misses in the home L2 portion, then the miss can be processed in accordance with the cache policies of the L2 cache, and the backing store (e.g. memory 54) is instead accessed.

For a read access which misses in the home L2 portion, a request is sent out to the backing store, and upon $L2_1$ receiving the read data from the backing store for allocation (i.e. storing) into $L2_1$, the returned read data is also allocated (i.e. stored) into the requesting L1 cache (L1 cache 44). The read data is also provided to the requesting processor (processor 46). However, note that the returned read data is not allocated or stored into the most local L2 portion nor any other L2 portion. For a write access, processing the miss includes providing the write access request and corresponding write data to the backing store. In one embodiment, a cache line may be allocated in the requesting L1 cache and the home L2 portion for the write access address and corresponding write data. Note that in the case of a write access address, it can only be allocated or stored in one L2 portion, i.e. the home L2 portion, and cannot be stored in multiple L2 portions. This ensures that memory coherency is maintained. Only read accesses to read-only locations can be stored to multiple L2 portions.

Note that the operations within each L1 cache or each L2 cache portion can be performed by cache control circuitry located within each cache or cache portion, or cache control circuitry located outside the caches. Also, while FIGS. 1 and 2 have been described in reference to a distributed L2 cache, the flow methods described above may also apply to distributed caches at different levels, such as with a level 3 (L3) distributed cache. The backing store in the example of FIG.

2 is memory 54. Memory 54 can be any type of memory, such as, for example, a dual data rate (DDR) memory, another cache memory, flash memory, etc. Furthermore, this backing store may be located on chip or integrated circuit with the L1 and distributed L2 caches, or may be located on a separate chip or integrated circuit.

Read-only address locations store read-only data, in which sharing coherency is not an issue. The read-only data may be, for example, code, constants, temporal constants or the like. In one aspect, read-only data can be defined as data that no processor or other system element will change the value of during the period that the data is being used, such that the value of the data will be considered the same regardless of where it is read from. On the other hand, read-write data may be modified by any processor or system element, and therefore coherency mechanisms are needed to ensure that all users of that read-write data see the same value. In one embodiment, a read-only address location may be located in a read-only memory or read-only section of memory in which the read-only address locations remain fixed as read-only. Alternatively, read-only data may only be read-only for a period of time. In one embodiment, address locations or ranges of address locations may be dynamically marked as read-only, as needed for a particular application. This is helpful, for example, in producer/consumer applications. In such an application, a producer creates data and marks the storage locations of the data as read-only. At this point, the consumers can be set to consume the data. When they are done, a barrier or fence can be used to evict all the data (both the original and the replicants) from the distributed L2 cache portions to allow for the writing of new data. If the data is consumed over a long period of time, the saving of the replicated data in a processor's most local L2 cache portion may improve performance of the producer/consumer application.

Therefore, by now it can be appreciated how access times can be improved in a distributed cache through the ability to have each distributed cache portion cover an assigned address range of the backing store as well as read-only memory locations which may be outside the assigned address range. For example, upon misses to both the local L1 cache and the L2 portion most local to that L1 cache, the home L2 portion for the particular read-only access address can be accessed to obtain the read data (either because it already resides the home L2 portion or because it is obtained from the backing store and allocated into the home L2 portion). Upon the home L2 portion obtaining the read data, the read data is also allocated or stored into the L2 portion most local to the L1 cache. In this manner, upon subsequent access to this read-only access address, it may be found in the most local L2 portion to the requesting L1 cache, without needing to access the home L2 portion for the access address at all. This differs from the typical distributed cache system or from the way non read-only locations are treated, in which, upon missing in the local L1 cache and the L2 portion most local to that L1 cache, the home L2 portion must always be accessed, increasing access time.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 20 may be located on a same integrated circuit as processor 12 or on a separate integrated circuit or located within another peripheral or slave discretely separate from other elements of system 10. Peripherals 16 also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. For example, the initiating of blocks 72, 94, and 100 can be performed simultaneously with or prior to the updating of blocks 74, 96, and 102, respectively. Also, the decrementing the count value of block 98 and reloading the count value of block 104 can be performed at other times with respect to blocks 94/96 and blocks 100/102, respectively, than as illustrated in FIGS. 3 and 4.

Although the invention is described herein with reference to specific embodiments, various modifications and changes can be made without departing from the scope of the present invention as set forth in the claims below. For example, different counter implementations may be used and can be implemented as increasing or decreasing a predetermined number of times in accordance with a counter reload value. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes a processor; a backing store; a local first level cache coupled to the processor, and configured to cover an address range of the backing store; a distributed second level cache, higher than the first level cache, having a plurality of distributed cache portions, wherein each of the plurality of distributed cache portions is assigned as a home cache portion for a corresponding non-overlapping address sub-range of the address range of the backing store; and a mesh network, wherein the plurality of distributed cache portions are interconnected via the mesh network, wherein upon receipt of a read access request to a read-only address location of the backing store from the processor, the local first level cache is configured to, when the read-only address location misses in the local first level cache, send the read access request to a most local distributed cache portion of the plurality of distributed cache portions for the local first level cache to determine whether the read-only access location hits or misses in the most local distributed cache portion, in which the most local distributed cache portion is not the home cache portion for the read-only address location. In one aspect of this embodiment, when the read-only access location misses in the most local distributed cache portion, the most local distributed cache portion provides the read access request to the home cache portion for the read-only address location to obtain the read data at the read-only address location. In a further aspect, the most local distributed cache portion is configured to, upon obtaining the read data from the home cache portion, store a copy of the read data with the read-only address location in a cache line of the most local distributed cache portion, such that the read data with the read-only address location is stored in a cache line of both the home cache portion for the read-only address location and the most local distributed cache portion. In yet a further aspect, the home cache portion is configured to provide the read data from the read-only address location from a hit entry of the home cache portion. In another further aspect, the home cache portion is configured to, upon a miss of the read-only address location in the home cache portion, access the backing store to receive the read data, allocate the read data into the home cache portion, and provide the read data to the most local distributed cache portion. In another aspect of the above embodiment, there is no distributed cache portion of the plurality of distributed cache portions coupled between the local first level cache and the most local distributed cache portion. In another aspect, a route via the mesh network from the local first level cache to the most local distributed cache portion is shorter in time than a route via the mesh network from the local first level cache to the home cache portion for the read-only address location. In yet another aspect, upon receipt of a read access request to an address location which is not a read-only location of the backing store from the processor, the local first level cache is configured to, when the address location which is not a read-only location misses in the local first level cache, send the read access request to the home cache portion for the address location to determine whether the address location which is not a read-only location hits or misses in the home cache portion. In a further aspect, when the address location which is not a read-only location hits in the home cache portion, the home cache portion is configured to provide read data for the address location which is not a read-only location directly to the local first level cache such that the read data for the address location which is not a read-only location is not stored in any other distributed cache portion of the plurality of cache portions other than the home cache portion. In yet a further aspect, when the address location which is not a read-only location misses in the home cache portion, the home cache portion is configured to receive read data for the address location which is not a read-only address location from the backing store to store into the home cache portion and is configured to provide the read data for the address location which is not a read-only location directly to the local first level cache such that the read data for the address location which is not a read-only location is not stored in any other distributed cache portion of the plurality of cache portions other than the home cache portion. In another aspect, the processor includes a memory management unit (MMU), the MMU is configured to indicate whether or not access addresses for read access requests correspond to read-only address locations or not. In yet another aspect, the data processing system further includes a plurality of processors, which includes the processor, wherein each processor of the plurality of processors is coupled via a corresponding local first level cache to a corresponding distributed cache portion of the distributed second level cache, in which the corresponding distributed cache portion is a most local distributed cache portion of the plurality of distributed cache portions to the corresponding local first level cache.

In another embodiment, in a data processing system having a processor, a local first level cache coupled to the processor, and a distributed second level cache, higher than the first level cache, having a plurality of distributed cache portions coupled via mesh network, a method includes receiving by the local first level cache, a read access request having a corresponding access address from the processor, wherein the corresponding access address addresses a location in a backing store whose address range is covered by the local first level cache; in response to determining a miss of the access address in the local first level cache, determining whether the access address is a read-only location of the backing store; and when the access address misses in the local first level cache and is a read-only location of the backing store, the method further includes: determining if the access address hits or misses in a most local distributed cache portion of the plurality of distributed cache portions for the local first level cache, wherein each distributed cache portion of the plurality of distributed cache portions is assigned as a home cache portion which covers a sub-range of the address range of the backing store; when the access address misses in the most local distributed cache portion, providing the read access request via the mesh network to the home cache portion which covers the access address, in which the home cache portion which covers the access address is not the same distributed cache portion as the most local distributed cache portion; and when the access address hits in the home cache portion which covers the access address, providing read data from a hit entry of the home cache portion which covers the access address to the most local distributed cache portion, and storing the read data in a cache line of the most local distributed cache portion such that the read data at the corresponding access address is stored in both the home cache portion which covers the access address and the most local distributed cache portion. In one aspect of the another embodiment, when the access address misses in the local first level cache and is not a read-only location of the backing store, the method further includes providing the access request via the mesh network to the home cache portion which covers the access address without accessing the most local distributed cache portion to the local first level cache; and when the access address hits in the home cache portion which covers the access address, providing the read data from the hit entry of the home cache portion which covers the access address to the local first level cache, and not storing the read data and the corresponding access address in any other distributed cache portion of the plurality of distributed cache portions other than the home cache portion which covers the access address. In another aspect, when the access address is a read-only location of the backing store and misses in the local first level cache, in the most local distributed cache portion, and in the home cache portion, the method further includes accessing the backing store to obtain read data from the access address; and allocating a cache line in the home cache portion for the access address and the read data. In yet another aspect, the sub-ranges covered by the distributed cache portions are non-overlapping. In another aspect, a route via the mesh network from the local first level cache to the most local distributed cache portion to the local first level cache is shorter in time than a route via the mesh network from the local first level cache to the home cache portion which covers the access address.

In yet another embodiment, a data processing system includes a processor; a backing store; a local first level cache coupled to the processor and configured to cover an address range of the backing store; a distributed second level cache, higher than the first level cache, having a plurality of distributed cache portions, wherein each of the plurality of distributed cache portions is assigned as a corresponding home cache portion for a sub-range of the address range of the backing store; and a mesh network, wherein the plurality of distributed cache portions are interconnected via the mesh network, wherein each distributed cache portion is configured to cache one or more read-only addresses of the backing store when the distributed cache portion is not the home cache portion for the one or more read-only addresses. In one aspect of the yet another embodiment, each distributed cache portion is configured to only cache non read-only addresses of the backing store to which the distributed cache portion is assigned as the corresponding home cache portion. In a further aspect, any read-only address of the backing store can be cached in multiple distributed cache portions, and any non read-only addresses can only be stored in its corresponding home cache portion.

What is claimed is:

1. A data processing system, comprising:
   a processor;
   a backing store;
   a local first level cache coupled to the processor, and configured to cover an address range of the backing store;
   a distributed second level cache, higher than the first level cache, having a plurality of distributed cache portions, wherein each of the plurality of distributed cache portions is assigned as a home cache portion for a corresponding non-overlapping address sub-range of the address range of the backing store; and
   a mesh network, wherein the plurality of distributed cache portions are interconnected via the mesh network, wherein upon receipt of a read access request to a read-only address location of the backing store from the processor, the local first level cache is configured to, when the read-only address location misses in the local first level cache, send the read access request to a most local distributed cache portion of the plurality of distributed cache portions for the local first level cache to determine whether the read-only access location hits or misses in the most local distributed cache portion, in which the most local distributed cache portion is not the home cache portion for the read-only address location.

2. The data processing system of claim 1, wherein when the read-only access location misses in the most local distributed cache portion, the most local distributed cache portion provides the read access request to the home cache portion for the read-only address location to obtain the read data at the read-only address location.

3. The data processing system of claim 2, wherein the most local distributed cache portion is configured to, upon obtaining the read data from the home cache portion, store a copy of the read data with the read-only address location in a cache line of the most local distributed cache portion, such that the read data with the read-only address location is stored in a cache line of both the home cache portion for the read-only address location and the most local distributed cache portion.

4. The data processing system of claim 3, wherein the home cache portion is configured to provide the read data from the read-only address location from a hit entry of the home cache portion.

5. The data processing system of claim 3, wherein the home cache portion is configured to, upon a miss of the read-only address location in the home cache portion, access the backing store to receive the read data, allocate the read data into the home cache portion, and provide the read data to the most local distributed cache portion.

6. The data processing system of claim 1, wherein there is no distributed cache portion of the plurality of distributed cache portions coupled between the local first level cache and the most local distributed cache portion.

7. The data processing system of claim 1 wherein a route via the mesh network from the local first level cache to the most local distributed cache portion is shorter in time than a route via the mesh network from the local first level cache to the home cache portion for the read-only address location.

8. The data processing system of claim 1, wherein upon receipt of a read access request to an address location which is not a read-only location of the backing store from the processor, the local first level cache is configured to, when the address location which is not a read-only location misses in the local first level cache, send the read access request to the home cache portion for the address location to determine whether the address location which is not a read-only location hits or misses in the home cache portion.

9. The data processing system of claim 8, wherein when the address location which is not a read-only location hits in the home cache portion, the home cache portion is configured to provide read data for the address location which is not a read-only location directly to the local first level cache such that the read data for the address location which is not a read-only location is not stored in any other distributed cache portion of the plurality of cache portions other than the home cache portion.

10. The data processing system of claim 9, wherein when the address location which is not a read-only location misses in the home cache portion, the home cache portion is configured to receive read data for the address location which is not a read-only address location from the backing store to store into the home cache portion and is configured to provide the read data for the address location which is not a read-only location directly to the local first level cache such that the read data for the address location which is not a read-only location is not stored in any other distributed cache portion of the plurality of cache portions other than the home cache portion.

11. The data processing system of claim 1, wherein the processor comprises a memory management unit (MMU), the MMU is configured to indicate whether or not access addresses for read access requests correspond to read-only address locations or not.

12. The data processing system of claim 1, further comprising a plurality of processors, which includes the processor, wherein each processor of the plurality of processors is coupled via a corresponding local first level cache to a corresponding distributed cache portion of the distributed second level cache, in which the corresponding distributed cache portion is a most local distributed cache portion of the plurality of distributed cache portions to the corresponding local first level cache.

13. In a data processing system, having a processor, a local first level cache coupled to the processor, and a distributed second level cache, higher than the first level cache, having a plurality of distributed cache portions coupled via mesh network, a method comprising:
  receiving by the local first level cache, a read access request having a corresponding access address from the processor, wherein the corresponding access address addresses a location in a backing store whose address range is covered by the local first level cache;
  in response to determining a miss of the access address in the local first level cache, determining whether the access address is a read-only location of the backing store; and
  when the access address misses in the local first level cache and is a read-only location of the backing store, the method further includes:
    determining if the access address hits or misses in a most local distributed cache portion of the plurality of distributed cache portions for the local first level cache, wherein each distributed cache portion of the plurality of distributed cache portions is assigned as a home cache portion which covers a sub-range of the address range of the backing store;
    when the access address misses in the most local distributed cache portion, providing the read access request via the mesh network to the home cache portion which covers the access address, in which the home cache portion which covers the access address is not the same distributed cache portion as the most local distributed cache portion;
    when the access address hits in the home cache portion which covers the access address, providing read data from a hit entry of the home cache portion which covers the access address to the most local distributed cache portion, and storing the read data in a cache line of the most local distributed cache portion such that the read data at the corresponding access address is stored in both the home cache portion which covers the access address and the most local distributed cache portion.

14. The method of claim 13, wherein when the access address misses in the local first level cache and is not a read-only location of the backing store, the method further comprises:
  providing the access request via the mesh network to the home cache portion which covers the access address without accessing the most local distributed cache portion to the local first level cache; and
  when the access address hits in the home cache portion which covers the access address, providing the read data from the hit entry of the home cache portion which covers the access address to the local first level cache, and not storing the read data and the corresponding access address in any other distributed cache portion of the plurality of distributed cache portions other than the home cache portion which covers the access address.

15. The method of claim 13, wherein when the access address is a read-only location of the backing store and misses in the local first level cache, in the most local distributed cache portion, and in the home cache portion, the method further comprises:
  accessing the backing store to obtain read data from the access address; and
  allocating a cache line in the home cache portion for the access address and the read data.

16. The method of claim 13, wherein the sub-ranges covered by the distributed cache portions are non-overlapping.

17. The method of claim 13, wherein a route via the mesh network from the local first level cache to the most local distributed cache portion to the local first level cache is shorter in time than a route via the mesh network from the local first level cache to the home cache portion which covers the access address.

18. A data processing system, comprising:
  a processor;
  a backing store;
  a local first level cache coupled to the processor and configured to cover an address range of the backing store;
  a distributed second level cache, higher than the first level cache, having a plurality of distributed cache portions, wherein each of the plurality of distributed cache portions is assigned as a corresponding home cache portion for a sub-range of the address range of the backing store; and
  a mesh network, wherein the plurality of distributed cache portions are interconnected via the mesh network, wherein each distributed cache portion is configured to cache one or more read-only addresses of the backing store when the distributed cache portion is not the home cache portion for the one or more read-only addresses.

19. The data processing system of claim 18, wherein each distributed cache portion is configured to only cache non read-only addresses of the backing store to which the distributed cache portion is assigned as the corresponding home cache portion.

20. The data processing system of claim 19, wherein any read-only address of the backing store can be cached in multiple distributed cache portions, and any non read-only addresses can only be stored in its corresponding home cache portion.

* * * * *